United States Patent [19]

Takezoe

[11] 4,054,949
[45] Oct. 18, 1977

[54] STAGNATION PREVENTION APPARATUS IN AN INFORMATION TRANSMISSION SYSTEM

[75] Inventor: Fumihiko Takezoe, Kawasaki, Japan

[73] Assignee: Fuji Electric Company Ltd., Kawasaki, Japan

[21] Appl. No.: 666,371

[22] Filed: Mar. 12, 1976

[30] Foreign Application Priority Data

Mar. 13, 1975 Japan .................. 50-30410

[51] Int. Cl.$^2$ .................. G06F 3/04; H04L 1/08
[52] U.S. Cl. .................. 364/900; 340/146.1 BA
[58] Field of Search .................. 340/172.5, 146.1 BA; 445/1; 179/15 AE, 15 AL

[56] References Cited

U.S. PATENT DOCUMENTS

| | | | |
|---|---|---|---|
| 3,421,147 | 1/1969 | Burton et al. | 340/172.5 |
| 3,426,323 | 2/1969 | Shimabukuro | 340/146.1 BA |
| 3,428,944 | 2/1969 | Shimabukuro | 340/146.1 BA X |
| 3,573,745 | 4/1971 | May, Jr. | 340/172.5 |
| 3,680,053 | 7/1972 | Cotton et al. | 340/172.5 |
| 3,932,841 | 1/1976 | Deerfield et al. | 340/172.5 |

*Primary Examiner*—Melvin B. Chapnick
*Attorney, Agent, or Firm*—Sughrue, Rothwell, Mion, Zinn and Macpeak

[57] ABSTRACT

An information processing system of the type having a plurality of stations interconnected via transmission lines. Each station is of the type which includes control devices, processing devices which respond to information sent thereto and which generate information to be sent to other processing devices at other stations, and communicating devices for transmitting and receiving information to and from the stations. In the information processing system, transmission and reception between two adjacent stations is independent of transmission and reception between any two other adjacent stations. A system is disclosed which prevents the stoppage of information transmission as a result of a build up of information at other than the given station. Apparatus is provided for detecting when a stagnation condition occurs and for temporarily increasing the length of the buffer registers in the communicating devices of the stations. Also, apparatus is provided for preventing any newly generated information at the processing devices from being removed.

4 Claims, 8 Drawing Figures

FIG 1 (PRIOR ART)
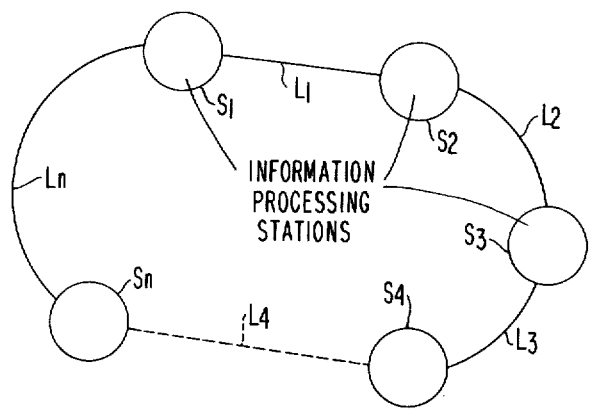
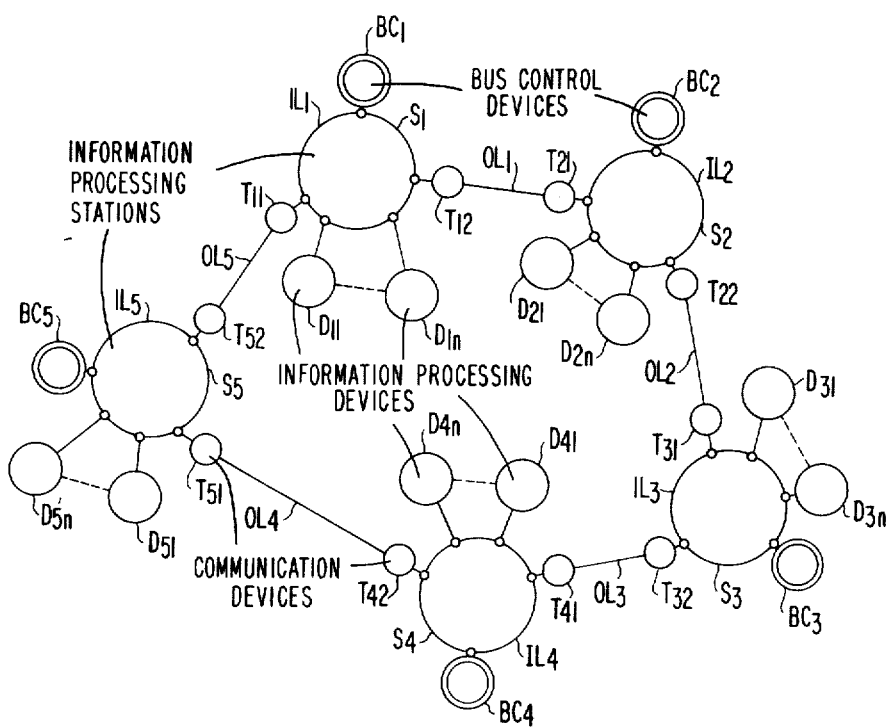
FIG 2 (PRIOR ART)

STAGNATION PREVENTION APPARATUS IN AN INFORMATION TRANSMISSION SYSTEM

BACKGROUND OF THE INVENTION

This invention relates to a stagnation prevention system for use in an information processing system of the type comprising a plurality of widely dispersed information processing stations, with singular or plural information processing devices, connected in cascade connection through information transmission lines, with information transmission being conducted mutually between optional stations, and the transmission between adjoining stations being respectively independent.

Since information processing stations are usually installed fairly distant from each other, connecting all the stations individually requires a large amount of money for transmission lines and a large amount of labor to install the transmission lines. To eliminate such a disadvantage in information processing systems of the type described, the plural information processing stations are connected in series, in a closed or open loop, as shown by the plural stations $S_1$-$S_n$ in FIG. 1. The stations are shown connected in order through the information transmission lines $L_1$-$L_n$.

In such an information processing system, the construction is such that one information transmission is not executed until the transmitted information from one station circulates through all the stations and returns to the station where the information is emitted, in order to attain a priority processing function and, further, to check for errors in the transmitted information. In addition, each station is provided with a bypass means which is switched into operation when the station is not operating irrespective of the cause of the inoperativeness. This prevents the failure of a single station from shutting down the entire system.

However, if the information from one station is required to circulate through all the stations and return to the source station, as mentioned above, several disadvantages result. The time for a single information transmission is relatively long and the efficiency of information transmission is low.

To eliminate the latter problem, an information processor of the construction as shown in FIG. 2 has been proposed.

In FIG. 2, $Si$ ($i = 1 - 5$) are information processing stations widely dispersed. Each of the stations is provided with various information processing devices $Dij$ ($i = 1 - 5, j = 1 - n$) which are connected through the common inner information transmission bus $ILi$ ($i = 1 - 5$). The inner transmission buses are controlled by the bus control devices $BCi$ ($i = 1 - 5$). Also, each station $Si$ is equipped with two communication devices $Tij$ ($i = 1 - 5, j = 1, 2$) having bilateral communication capabilities and being connected to the internal bus $ILi$. Each communication device, $Tij$, of each station is connected to one of the communication devices of an adjacent station via one of the external information transmission lines, $OLi$ ($i = 1 - 5$). For example, the communication device $T_{12}$ of station $S_1$ is connected to the communication device $T_{21}$ of station $S_2$, and the communicating device $T_{22}$ of station $S_2$ is connected to the communication device $T_{31}$ of station $S_3$, etc., so that the five stations $S_1$-$S_5$ are connected in series in a closed loop, constituting an information processor of the closed loop type.

Therefore, in an information processor constructed in this manner, the communication devices installed at each station have the following functions: to receive information from the internal bus of the station to which they belong, which information is addressed for transmission to an information processing device in another external station, and to transmit that information to an external transmission line connected thereto; and to receive information from the external transmission line connected thereto and transmit that information to the internal bus of the station to which they belong. The transmission of information between the communication devices and the processing devices in a station is subject to the control of the bus control device in the same manner that information is transmitted between the processing devices. However, the transmission of information to and from other external stations is free from control by the bus control device. Such information is freely and independently conducted between communication devices which are connected via an external line.

The transmission of information within a station, to and from the communication devices, is controlled by the bus control device as follows. As an example, assume that information addressed to processing device $D_{3j}$ in the station $S_3$ is transmitted to the internal bus $IL_1$ in the station $S_1$ from the information processing device $D_{1j}$ or the communication device $T_{1j}$ in station $S_1$. When the system is working properly, the bus control device $BC_1$ will control the bus $IL_1$ so as to cause the information to circulate in a prescribed direction. If the direction is the right hand direction, the control is such that the transmitted information is put into the communication device $T_{12}$. When the communication device $T_{12}$ thus receives the information, destined for another external station, it transmits said information via the external transmission line $OL_1$ to the communication device $T_{21}$ of station $S_2$. Now, assuming that the communication device $T_{11}$ receives transmitted information from communication device $T_{52}$ of station $S_5$, via external transmission line $OL_5$, device $T_{11}$ emits the information received to the internal bus $IL_1$ with permission of and under the control of the bus control device $BC_1$. In this case, if the information is addressed to an information processing device in the station $S_{11}$, the bus control device $BC_1$ will control the bus $IL_1$ to cause the information to be put into the information processing device $D_{1j}$ to which the information is addressed. If, on the other hand, the information is addressed to an information processing device in a station other than $S_1$, the bus control device $BC_1$ will control the bus $IL_1$ such that the information will be put into the other communication device $T_{12}$; similarly to the case when such information is emitted from an internal information processing device. Thus the information will be transmitted outside the station $S_1$ through the communication device $T_{12}$ without being put in the station $S_1$ and passes through the station $S_1$.

All of the other stations work similarly to $S_1$. Thus, if the information is to be transmitted from $S_1$ to $S_3$, the information generated in station $S_1$ is first transmitted by communication device $T_{12}$ to comunication device $T_{21}$ of station $S_2$ via external transmission line $OL_1$. Then, in the station $S_2$, the information received by communication device $T_{21}$ is sent to communication device $T_{22}$, since it is not addressed to the station $S_2$, and is transmitted to communication device $T_{31}$ of adjoining station $S_3$. In station $S_3$, the information received by the communication device $T_{31}$ is sent to bus $IL_3$ from communication device $T_{31}$, since it is addressed to one of the information processing devices $T_{3j}$ inside station $S_3$ itself, and is transmitted to the designated information processing device $D_{3j}$. Thus, the information is not transmitted outward, thereafter. Similarly, information transmission may be executed between any two stations.

In the kind of information processor described, where information transmission is conducted freely and independently between adjoining stations, the transmission efficiency of information is remarkably improved due to the capability of simultaneous information transmission between all adjoining stations.

In this kind of information processor, however, when an error arises in the transmitted information received by the station $S_2$ because of the mixture of noise from the transmission line $OL_1$, etc. in the transmission of information from the station $S_1$ to $S_2$, transmission of the same information is repeated from the stations $S_1$ to $S_2$ until correct information transmission is attained. During that time, therefore, new information can not be transmitted from the station $S_1$ to $S_2$, so that new information which is generated in station $S_1$ and addressed to other stations stagnates and is stored temporarily in a buffer register of a buffer circuit installed in the communication device $T_{12}$. When the buffer circuit becomes full, the stagnation of the information transmission in station $S_1$ spreads to the preceding station $S_5$, causing the buffer circuits in the station $S_5$ to fill up. Similarly, stagnation of the information transmission spreads to the adjoining stations in order and, in the worst case, the buffer circuits for external transmission in all the stations become full, terminating all information transmission between the stations and bringing the whole device to a deadlock.

SUMMARY OF THE INVENTION

This invention is directed to a stagnation prevention system in an information transmission system of the type having a multiple number of information processing stations connected in series though external information transmission lines, the information transmission between adjoining stations being independent, wherein the influence of the stagnation of information transmission occurring at one station, due to the inability of correct information transmission after repetition of transmission of the same information for more than a prescribed number of times, can be prevented in advance from spreading to all the stations and bringing about the worst case of termination of the information transmission between the stations.

Such an object may be achieved, according to this invention, by providing to each station buffer circuits with a prescribed number of buffer registers for temporary storage of externally transmitted information. Also, at least one spare buffer register, which is used for stagnation prevention, is connected to the buffer circuits of at least one of the plural stations. When a stagnation condition exists the system prohibits demands for outward information transmission by the information processing devices. Also the spare buffer registers are temporarily added to the associated buffer circuits to permit information transmission continue.

BRIEF DESCRIPTION OF THE DRAWINGS

FIGS. 1 and 2 are block diagrams of prior art information processing systems to which the subject invention is applied.

DETAILED DESCRIPTION OF THE PREFERRED EMBODIMENTS

FIGS. 1 and 2 have been previously described above. As noted the drawings show the known arrangement of an information processing system to which the subject invention is applicable.

Figure 3:
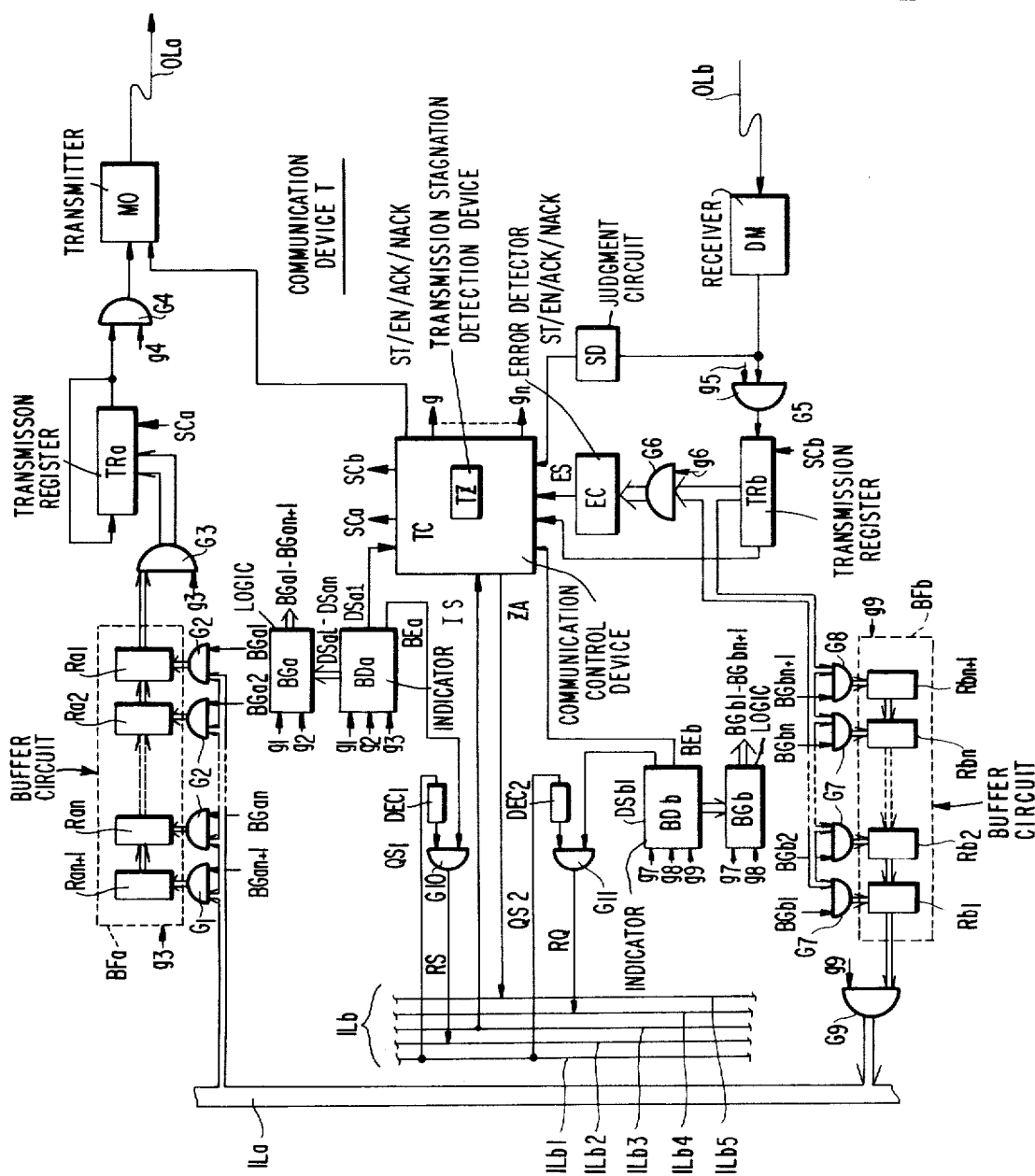
FIG. 3 is a block diagram showing an embodiment of a communication device used in the invention.

In FIG. 3, IL$a$ and IL$b$ are respectively an information line and control lines composing the internal information transmission bus IL in a station; OL$a$ and OL$b$ are respectively a transmission line and a receiving line composing the outer information line OL; and the rest of the apparatus corresponds to the communication device T referrred to generally in connection with FIG. 2. The communication device is provided with a communication control device TC. The latter device controls the transmission function, i.e., to transmit out the information within the station via the transmission line OL$a$, and the receiving function, i.e., to receive the information transmitted to the communication device from outside the station via the receiving line OL$b$ and to transmit that information inside the station. Buffer circuits BF$a$ and BF$b$ are provided comprising normally used n-stage (n: integer more than 1) buffer registers or the memories $R_{a1}$-$R_{an}$, $R_{b1}$-$R_{bn}$, respectively, for temporary storage of information transmitted from outside to inside of the station and information transmitted from inside to outside, and spare one-stage buffer registers or memories $R_{an+1}$, $R_{bn+1}$ for stagnation prevention. Also included are, the transmission register TR$a$ and the receiving register TR$b$ for series-parallel conversion and parallel-series conversion of the transmitted information, the transmitter MO for modulation and transmission of the information to the transmission line OL$a$, the receiver DM for reception and demodulation of the signal on the receiving line OL$b$. Gates $G_1$-$G_9$ are gates for transmission of the information controlled by the communication control device TC. Gate $G_{10}$ is a response gate for emitting to the bus control device, not indicated in the figure, whether the buffer circuit BF$a$ is ready to receive the outward transmitted information. $G_{11}$ is a demand gate for emitting a demand signal to use the bus in order to transmit into the station the transmitted information from outside stored in the buffer circuit BF$b$. Furthermore, a judgement circuit SD, an error detecting circuit EC, buffer indication circuits BD$a$, BD$b$ for indicating the states of use of the buffer circuits BF$a$, BF$b$, and buffer logic circuit BG$a$ and BG$b$ are provided. Also, the control line means IL$b$ comprises the inquiry signal line IL$b_1$, the response signal line IL$b_2$, the instruction signal line IL$b_3$, the demand signal line IL$b_4$, and the trouble signal line IL$b_5$. To the internal information bus IL, consisting of control line means IL$b$ and information line IL$a$, are connected, the bus control device, the information processing devices and the other communication device in the station, all of which are not indicated in the figure, but which connections are well known in the art. The ends of transmission line OLa and receiving line OLb of the outer transmission line OL are respectively connected to the receiver and the transmitter of the communication device of the next adjacent station.

A communication device of such construction works as follows.

When the station has a request from the station's other communication device or from one of the station's information processing devices to send information to some other station, the inquiry signal $QS_1$ is generated in a known manner and placed on line $IL b_1$ inquiring whether the transmission-side buffer circuit BFa of the communication device T is ready to receive the information. This inquiry signal is decoded by $DEC_1$ which thereafter applies a "1" signal as one input to the response gate $G_{10}$. To the other input of gate $G_{10}$ is applied the buffer empty signal BEa, formed by the buffer indication circuit BDa.

Figure 4:
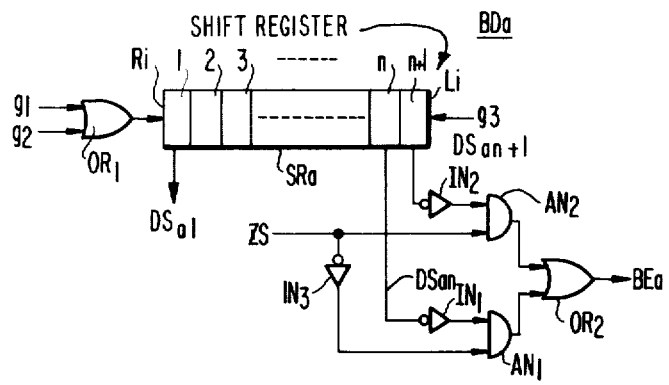
FIG. 4 is a block diagram showing an embodiment of a buffer circuit according to the invention.

As shown in FIG. 4, the buffer indication circuit, BDa, comprises a reversible shift register, SRa, having a number of stages equal to the number of buffer register stages in the buffer circuit BFa, i.e., $n + 1$ stages. The shift register is shifted towards the right by the right shift input Ri, which is derived from the output of OR gate $OR_1$. The inputs to $OR_1$ are $g_1$ and $g_2$, the same gate signals applied to buffer logic circuit BGa. The shift register is shifted to the left by shift input Li, which is gate signal $g_3$. The latter gate signal is also applied to the read-out gate $G_3$ of buffer circuit BFa. The register SRa works to move the bits therein to the right and simultaneously enter a "1" bit in response to each shift signal applied at Ri. When a shift signal is applied to the shift input Li, all bits move one position to the left. This effectively "zeroes" the last stage. As a result, the bits of shift register SRa are respectively related to the buffer register at every stage of the buffer circuit BFa and indicate the respective states of use.

When reading in the information through the gate $G_1$ or plural gates $G_2$, the buffer circuit BFa stores successively from the first register $Ra_1$ to the subsequent registers and, when reading out the information stored through the gate $G_3$, reads out at the first register and works to move the information at each register respectively one stage ahead every time the information is read out at the first register $Ra_1$. Therefore, the information stored at the buffer circuit BFa always fills the $(n+1)$ stage registers beginning with the first stage register $Ra_1$.

Figure 8:
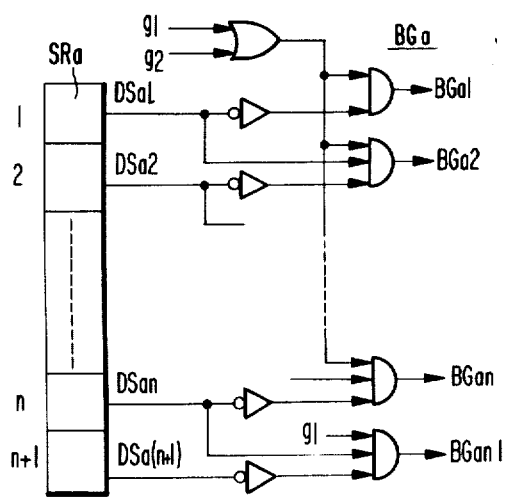
FIG. 8 is a block diagram of a logic circuit used in connection with FIG. 3.

The order of entry of the information is controlled by buffer logic circuit BGa, which is shown in detail in FIG. 8. As will be appreciated, the shift register SRa is the same one as is shown in FIG. 4. The logic circuit operates to generate the gating pulse BGai in response to the gating pulse $g_1$ or $g_2$, where the shift register stages 1 thru $i - 1$ are filled with binary 1's and the shift register stages $i$ thru $n + 1$ are filled with 0's. Since the stages of SRa are filled or empty in correspondance with the stages of buffer BFa, and since the sub-gating pulses $BG_{a1}$ thru $BG_{an}$ are applied as shown in FIG. 3 to the gates $G_2$, it can be seen that the logic circuit of FIG. 8 controls the entry of information into buffer circuit BFa in the desired order. Although not illustrated in FIG. 3, it should be noted that gating pulse $g_3$ not only causes the contents of buffer register stage $Ra_1$ to be read out, it also shifts the contents of each buffer stage one stage to the right, e.g. the information in buffer register stage Rai shifts to buffer register Ra(i-1).

At normal times, the gate $G_1$ is inhibited and the information is read into the buffer circuit BFa through one of the gates $G_2$, so that the $(n+1)$th stage buffer register $R_{an+1}$ of the buffer circuit BFa is effectively separated from the buffer circuit BFa and the buffer circuit BFa stores $n$ pieces of information.

The above-mentioned buffer indication circuit BDa, the buffer logic circuit BGa, and the buffer circuit BFa perform in relation to each other as follows. Namely, when two pieces of information are read into the buffer circuit BFa through the first two gates $G_2$, for example, the information is stored in the buffer registers $R_{a1}$ and $R_{a2}$. The gate signal $g_2$ is applied twice to cause the read in of the information. These gate signals are applied to the shift register SRa of the buffer indication circuit BDa as the shift-right signals, and therefore the contents of the first and second bits of this register change from "0" to "1". They are also applied to buffer logic circuit BGa to generate sub-gate pulses $BG_{a1}$ and $BG_{a2}$ in succession. The sub-gate pulses cause the two items of information to enter register stages $R_{a1}$ and $R_{a2}$, respectively. Hence, it is indicated by BDa that information is being stored in the corresponding first stage register $R_{a1}$ and second stage register $R_{a2}$ of the buffer circuit BFa. When a piece of information is read out of the buffer circuit BFa through the gate $G_3$, it is read from the first stage register $R_{a1}$. Thereafter the information stored in the second stage $R_{a2}$ is moved to the first stage register $R_{a1}$, resulting in the situation that information is stored only in the first stage register $R_{a1}$ in the buffer circuit BFa. In the process of reading out, the gate signal $g_3$ applied to the gate $G_3$ is also applied to the shift register SRa, causing the left shift. Therefore, in the shift register SRa, only the content of the first stage is "1" and that of the other stages is "0". It is thus indicated that information is stored only in the first stage register $R_{a1}$ of the buffer circuit BFa and that the other registers are vacant. When $n$ pieces of information, i.e., the full buffer capacity, are read into the buffer circuit BFa, information is stored in all the buffer registers $R_{a1}$ through $R_{an}$. In this case, the contents of all the stages from the first to the $n$th of the buffer indication circuit BDa become "1".

Since the shift register SRa of the buffer indication circuit BDa thus indicates the state of storage of information in the buffer circuit BFa at each instant, monitoring the content of the first stage of the register SRa enables a determination as to whether any information is stored in the buffer circuit BFa. Also monitoring the content of the $n$th stage enables a determination as to whether there is any vacancy in the buffer register of the buffer circuit BFa. Therefore, the output signal $DS_{a1}$ of the first stage of register SRa is applied to the communication control device TC as the instruction signal for transmission. The output signal $DS_{an}$ of the $n$th stage of register SRa is applied through the inverter circuit $IN_1$ to one input of the AND circuit $AN_1$. The output signal ZS is applied via inverter circuit $IN_3$ to the other input of AND circuit $AN_1$. The signal ZS comes from the transmission stagnation detection device TZ of this invention, as will be described later. The signal ZS is "0" at times without any transmission stagnation and is "1" when transmission stagnation occurs. Therefore, the AND circuit $AN_1$ produces a "1" output at normal times while the content of the $n$th stage of the register SRa is "0", because both the signal ZS and the signal $DS_{an}$ are "0". When the content of the $n$th bit of the register SRa becomes "1", the output of the AND circuit $AN_1$ becomes "0". The above output of the AND circuit $AN_1$ is picked up as the buffer empty signal $BEa$ (in reality designating that the buffer is not full) through the OR circuit $OR_2$ and added to the above-mentioned response gate $G_{10}$. At normal times this buffer empty signal $BEa$ becomes "1", as evident in the above description, when the content of the $n$th bit of the register $SRa$ of the buffer display circuit $BDa$ is "0", namely when at least the $n$th stage buffer register $R_{an}$ of the buffer circuit $BFa$ is empty and permits the input of information. When the content of the $n$th stage of the register $SRa$ is "1", namely when information is stored up to the $n$th stage buffer register $R_{an}$ of the buffer circuit $BFa$ and the input of information is not possible because there is no vacant register, the buffer empty signal $BEa$ becomes "0". The $(n+1)$th stage buffer register $R_{an+1}$ of the buffer circuit $BFa$ and the $(n+1)$th bit of the register $SRa$ of the buffer display circuit $BDa$ become effective when a stagnation occurs but are not used at normal times without a stagnation, as clarified in the description below. Therefore, the AND circuit $AN_2$ of the buffer display circuit $BDa$ has a "O" output at normal times.

In the case where the buffer empty signal $BEa$ is "1", the gate $G_{10}$ is energized. Thus if a demand for outward transmission of information arises in a station, the inquiry signal $QS_1$ is transmitted from the bus control device to the communication device T through the inquiry signal line $ILb_1$ and converted to "1" signal at the decoder $DEC_1$ to be immediately transmitted to the bus control device through the response signal line $ILb_2$ as the response signal RS. Then, the bus control device instructs the communication device or information processing device, which has requested information transmission, to proceed with transmission and simultaneously applies the instruction signal IS, for the input of information, to the communication control device TC through the instruction signal line $ILb_3$. The communication control device TC interprets the instruction signal IS and immediately generates the gate signal $g_2$ to result in the entry of information via gate $G_2$, so that the information emitted from the inside of the station via the information bus $ILa$ is put in the buffer circuit $BFa$ through the gate $G_2$ and stored sucessively starting from the first stage buffer register $R_{a1}$.

Now, when information is stored at least in the first stage $R_{a1}$ in the buffer circuit $BFa$, the content of the first stage of the register $SRa$ of the buffer display circuit $BDa$ becomes "1", and thus a "1" bit is applied to the communication control device TC. This starts the performance of the transmission control sequence at the communication control device TC and outward information transmission is executed as follows.

First, when it is confirmed that the transmission register $TRa$ is vacant, the gate signal $g_3$ is emitted and given to the readout gate $G_3$. Hence, the information stored in the first buffer register $R_{a1}$ of the buffer circuit $BFa$ is read out and transmitted to the transmission register $TRa$. Subsequently, the start signal ST indicating start of information transmission from the control device TC is given to the transmitter Mo, which transmits to the transmission line $OLa$ of the external information transmission line OL. Then, the shift clock signal SCa is given to the transmission register $TRa$ from the control device TC and at the same time the gate signal $g_4$ is given to the transmission gate $G_4$, so that the information consisting of plural bits set in the transmission register $TRa$ is read out bit by bit in series and transmitted to the transmission line $OLa$ via the transmitter Mo. Since the transmission register $TRa$ consists of a circular type shift register, the content is the same as that set at the beginning when one word of information has been transmitted, thus making it possible to retain the transmitted information. The communication control device TC transmits the stop signal EN indicating the conclusion of information transmission, when one transmission of information has been finished. At the same time the stop signal EN starts the count performance of the timing counter TK (FIG. 5) of the transmission stagnation detecting device TZ built-in the communication control device TC.

On the other hand, the transmitted information from an external station is received as follows. Namely, the signal from the receiving line $OLb$ is received by the receiver DM and the reception output signal of the receiver DM is monitored at all times by the signal judgement circuit SD, which is a typical code detector circuit. Now, when the start signal ST transmitted prior to the information signal is detected by the signal judgement circuit SD, the communication control device TC starts the reception control sequence in response thereto and immediately gives the shift clock signal SCb, synchronous with the information signal, to the receiving register $TRb$. Also, the gate signal $g_5$ is applied to the reception gate $G_5$ to open the gate $G_5$. Thus, the information signal transmitted in bit series subsequent to the start signal is put in the receiving register $TRb$ bit by bit. When the stop signal, EN, designating the conclusion of the information signal transmission, is detected by the signal judgement circuit SD, the control device TC shuts down the gate signal $g_5$ and terminates the performance of the receiving register $TRb$ to read in information signals. Then, the control device TC gives the gate signal $g_6$ to the gate $G_6$ to introduce the information set in the register $TRb$ into the error detection circuit EC. The error detection circuit EC executes error detection of the transmitted information by a conventional method, such as parity detection. At the same time, the vacancy of the buffer circuit $BFb$ on the receive side is checked by the buffer display circuit $BDb$ of the same construction as that of the above-mentioned buffer display circuit $BDa$. When the buffer empty signal $BEb$ is "1" and the detection output signal ES in the above-mentioned error detection circuit EC is "0", indicating no error, the communication control device TC immediately emits the response signal ACK, indicating that normal reception has been completed, and transmits the latter signal back to the communication device of the opposite station through the transmission line $OLa$ by the transmitter Mo, thereby acknowledging receipt of the information from the opposite station. Simultaneously, the gate signal $g_7$ is given to one of the gates $G_7$ under control of logic circuit $BGb$, which operates identically to logic circuit $BGa$, and the information set in the receiving register $TRb$ is put into the buffer circuit $BFb$. The buffer circuit $BFb$ operates exactly like buffer circuit $BFa$ so that the information is always entered into "the empty stage nearest the front end of the buffer circuit", i.e., nearest stage $Rb_1$. When information is stored in at least the first stage register $Rb_1$ of the buffer circuit $BFb$, the buffer indication circuit $BDb$ generates the transmission demand signal $DSb_1$, of "1" value, and applies same to the demand gate $G_{11}$. If under these circumstance the inquiry signal $QS_2$ inquiring whether there is any demand for use of the internal information bus is transmitted from the bus control device to the communication device T via the inquiry signal line ILb$_1$, this is converted to a "1" signal by the decoder DEC$_2$ and added to the gate G$_{11}$, which transmits the bus use demand RQ of value "1". When the signal RQ is emitted to the bus control device through the demand signal line ILb$_4$, the bus control device accordingly transmits to the communication control device TC the instruction signal IS for instructing TC to initiate write out. On receiving the signal IS, the communication control device TC gives the gate signal g$_9$ to the emission gate G$_9$. By this, the transmitted signal from outside stored in the first stage register Rb$_1$ is emitted in the information line ILa through the gate G$_9$. The information emitted in the information line ILa is controlled to be put in an information processing device or the other communication device inside the station according to the address for transmission, by the bus control device.

In the above reception performance, if the buffer empty signal BEb is a "0" bit signal, indicating that all the stages of buffer circuit BFb are full and entry of new information is not allowed, or if the checking output signal ES is a "1" bit signal, indicating the presence of an information transmission error, the transfer of the information set in the receiving register TRb into the buffer circuit BFb is prohibited. The communication control device TC, when receiving a buffer empty device signal BEb of "0" value, generates a negative acknowledge signal, NACK, indicating the inability of the above communication device to receive further information. The locally generated NACK signal is transmitted to the communication device of the opposite station by transmitter Mo. Also, the communication control device TC, when receiving a checking output signal ES of "1" value, indicating the occurrence of an error, prohibits the transmission of acknowledge ACK transmitted when normal reception has been done, assuming that normal reception has not been executed.

Since the communication device of the opposite station, not shown in FIG. 3, connected to the ends of the external information transmission lines OLa and OLb of the communication device T also performs exactly the same as that described above, the response signal ACK is transmitted therefrom when normal reception has been executed therein, and a negative acknowledge signal, NACK, is transmitted therefrom when reception is impossible therein. The latter signals are sent to the communication device T of FIG. 3 through the reception circuit OLb within a prescribed time after one transmission of the information set in the transmission register TRa is over.

When an acknowledge signal, ACK, is received and detected by signal judgement circuit SD, the communication control device TC emits a reset signal to the transmission register TRa to reset the transmission register TRa to prepare for new information.

Figure 5:
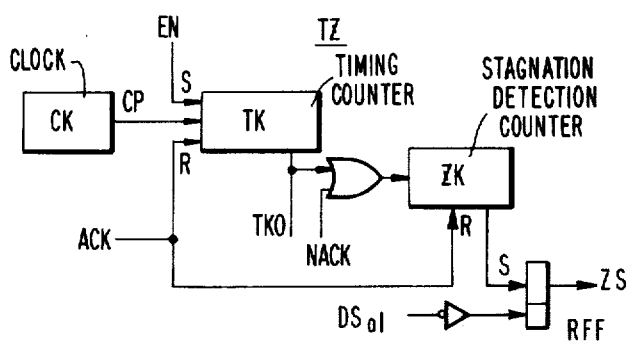
FIG. 5 is a block diagram showing an embodiment of a transmission stagnation detection device used in the invention.

Also, the received ACK signal, along with the locally generated stop signal EN, indicating the conclusion of transmission of the previous information, is applied to the TZ circuit, shown in detail in FIG. 5. The received ACK resets a timing counter TK, which counts the clock signal CP transmitted from a clock transmitter CK, thereby terminating the counting performance of the timing counter TK. Therefore, the count in the counter TK indicates the time from the termination of the information transmission i.e., local generation of EN, to the reception of ACK from the opposite communication device. This time will be within a prescribed time when normal communication is being executed. Counter TK, in which the prescribed time is preset, generates a "1" signal at the output TKO when the count exceeds the set. Therefore the count output TKO of "1" value occurs when the station does not receive an acknowledge signal ACK from the opposite communication device within a prescribed time after completion of the information transmission. This indicates that normal reception has not been executed in the opposite communication device.

When receiving the count output TKO of "1", the communication control device TC restarts the transmission control sequence and executes retransmission of the same information set in the transmission register TRa. Repeated retransmission of the same information occurs until an acknowledge ACK is received indicating normal communication has been executed.

Also when the communication device T receives a negative acknowledge signal NACK from the opposite communication device, the communication control device TC forces repetitive transmission of the same information set in the transmission register TRa until negative acknowledge NACK is no longer received, similarly to the case when the count output TKO is generated from the timing counter TK.

The above-mentioned count output TKO and the received negative acknowledge NACK are counted by the stagnation detection counter ZK as shown in FIG. 5. The number accumulated in the stagnation detection counter ZK indicates the number of times the same information is transmitted.

Thus, in the communication device T, when correct reception has not been executed due to the presence of noise in the transmission line, etc., or when the buffer circuit on the reception side is too full to accept the received information, retransmission of the same information is repeated many times until correct information reception is executed in the opposite communication device or until the received information is accepted. However, in execution of such retransmission, new information can not be transmitted and information stored in the buffer circuit BFa begins to stagnate. As the number of retransmissions of a piece of information increases, the transmission stagnation gets more serious until the buffer circuit BFa is full and reception of subsequently generated new information is not permitted.

In the communication device T$_{12}$ of the station S$_1$ of the information processor in FIG. 2, for instance, if such stagnation of information transmission should occur with the same information retransmitted repeatedly to the opposite communication device T$_{21}$ of the station S$_{21}$ it becomes impossible to transmit to the communication device T$_{12}$ the information for transmission to the other stations stored in the buffer circuit BFa on the reception side of the other communication device T$_{11}$ belonging to the same station, resulting in a stagnation of information transmission also at the buffer circuit on the receiving side of the communication device T$_{11}$. This makes the buffer circuit on the receiving side of the communication device T$_{11}$ fill up and unable to receive the transmitted information from the communication device T$_{32}$ of the opposite station S$_5$, resulting in a stagnation of the transmitted information also at the communication device T$_{52}$. Similarly the stagnation of the transmitted information spreads successively to the stations S$_4$, S$_3$ and S$_2$ and, in the worst case, the buffer circuits of all the communication devices of all the stations are filled with the transmitted information, suspending completely the information transmission between the stations.

The apparatus and process described above, with the exception of the apparatus and process for correcting stagnation, is described in Japanese Pat. applications Nos. 15767/74 and 17628/75, the latter corresponding to U.S. application Ser. No. 657,662, filed Feb. 12, 1976. The improvement brought about by the present invention will now be described.

In this invention, the number of retransmissions of the same information in the communication device T is monitored by the stagnation detection counter ZK as shown in FIG. 5, so that the information processor may be prevented from falling into the state where information transmission is suspended. The stagnation detection counter ZK has preset therein the allowable number of retransmissions of the same information determined by the buffer capacity. The counter ZK generates the stagnation detection signal ZS when the count exceeds the preset value, indicating that stagnation of the transmitted information has occurred. The ZS signal is generated by having the output from ZK set the flip-flop FF, whose set output is the signal ZS.

When the stagnation detection signal ZS is generated from the stagnation detection counter ZK, the communication control device TC of this invention accordingly generates the stagnation informing signal ZA and transmits it to the bus control device through the trouble signal line $ILb_5$. Additionally, TC prohibits the internal generation of the gate signals $g_2$ and $g_7$ and, instead, permits generation of the gate signals $g_1$ and $g_8$. Therefore, in the communication device T, the spare buffer registers $R_{an+1}$ and $R_{bn+1}$ of the buffer circuits BFa and BFb become effective, increasing the capacity of the buffer circuit by one stage of the buffer register. Also, because the stagnation detection signal ZS is added to the buffer indication circuits as shown in FIG. 4, the AND circuit $AN_2$ becomes effective instead of the AND circuit $AN_1$ and the state of the $(n+1)$th bit of the register SR, namely the state of the $(n+1)$th stage buffer register of the buffer circuit is monitored. Therefore, even if the buffer circuit BFa is full thru stage $R_{an}$ a condition resulting in ordinarily BEa of "0", the fact that the stage $R_{a(n+1)}$ has been effectively added to the circuit by the generation of ZS will cause the signal BEa to be a "1" signal, indicating a vacancy of the buffer circuit $BF_{an}$, by the On the other hand, when the bus control device receives the stagnation informing signal ZA from the communication device T, it transmits this signal to its opposite communication device and from there to all the stations via the transmission line. When a transmission stagnation is detected in the transmission from the station $S_1$ to the station $S_2$, for instance, in the device in FIG. 2, the stagnation informing signal ZA is generated in the station $S_1$ and transmitted in the opposite direction to that of information transmission in the sequence $S_1$-$S_5$-$S_4$-$S_3$-$S_2$. When such stagnation informing signal ZA is received at each station, the bus control device of the station instructs the communication devices under control to add the theretofore ineffective spare buffer circuits and make them effective. At the same time, the bus control device works to receive only the demands for external transmission from the communication device within the station and prohibits receiving the demands for external transmission from the other information processing devices.

Figure 6:
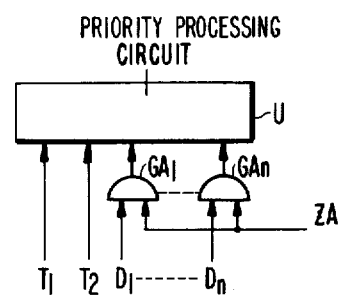
FIG. 6 and FIG. 7 are block diagrams showing respectively different embodiments of circuits for selectively prohibiting reception of the demands for information transmission according to this invention.

Such selective prohibition of reception of the demands for information transmission can be executed by a simple arrangement shown in FIG. 6. The device U represents a priority processing circuit which determines the priority of requests from the stations, two communication devices $T_1$ and $T_2$ and the n information devices $D_1$ - $D_n$. By interposing gates $GA_1$ - $GA_n$ between the priority circuit U and the requests from $D_1$ - $D_n$, and by closing the gates when ZA is present, only the requests for transmission emanating from the communication devices $T_1$ and $T_2$ can be considered by the station.

Figure 7:
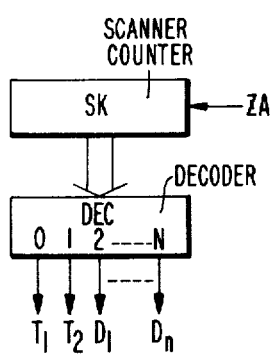

An alternative scheme is shown in FIG. 7. There a conventional scanning counter SK is switchable between a first state where it counts between 0 and 1 and a second state where it counts from 0 to N (note N is not the same as n). The number in the counter is decoded by a decoder which provides priority outputs $T_1$ - $D_n$ in sequence corresponding to the numbers $0 - (n+1)$, respectively, in counter SK. The outputs $T_1$ - $D_n$ represent the requests for transmission. When ZA is present, SK reverts to its first state whereby it counts only between 0 and 1. In the latter case the request outputs can only be $T_1$ or $T_2$.

Thus, when a transmission stagnation arises in a station, reception of the demands for external information transmission from the information processing device other than the communication devices is prohibited in each station and the externally transmitted information is not newly generated. And in the communication devices in each station, the spare stagnation preventing buffer registers are added to the buffer circuits, producing vacancies in the buffer circuits. Therefore, even in the worst case when the buffer circuits are all full of information and information transmission between stations is completely suspended due to the occurrence to a transmission stagnation, information transmission between stations is permitted because vacancies are generated in the buffer circuits of the communication devices in each station.

Namely, when transmission stagnation is detected by the stagnation detection device TZ (FIG. 5) and the detection signal SZ becomes a "1" signal, in the communication device T (FIG. 3), the buffer display circuit BDa (FIG. 4) generates a "1" signal from the AND circuit $AN_2$, converting the buffer empty signal BEa to a "1" signal, because the content of the $(n+1)$th bit of the register SRa is still "0", indicating that the $(n+1)$th stage buffer register $R_{an+1}$ of the buffer circuit BFa is vacant, even if the buffer display circuit BDa (FIG. 4) should have been theretofore generating the buffer empty signal BEa of "0" signal with information filled up to the nth stage register $R_{an}$ of the buffer circuit BFa. This performance is conducted completely in the same manner also by the buffer display circuit BDb on the receiving side. Therefore, the buffer empty signals BEa and BEb of "1" signal are given to the response gate $G_{10}$ and the communication control device TC respectively from the buffer display circuits BDa and BDb.

Since the demands for external information transmission from the information processing device other than the communication devices in the station are prohibited under the above circumstances, the demands for information transmission generated at the other communication device not indicated in the figure are immediately received and the inquiry signal $QS_1$ inquiring whether it is possible to put in the externally transmitted information is transmitted from the bus control device to be communication device T via the inquiry signal $ILb_1$. From the communication device T, the response signal RS of "1" signal indicating that it is possible to put in information is immediately transmitted to the bus control device through the response signal line $ILb_2$, because the response gate $G_{10}$ is already open. Since the instruction signal IS from the bus control device for instructing to put in is thereby transmitted to the communication device T, the communication control device TC gives the gate signal $g_1$ to the $BG_{an1}$ (FIG. 8), which gates open gate $G_1$, in order to enter into the spare buffer register $R_{an+1}$ the buffer circuit BFa the information written on the information line ILa from the other communication device.

Hence, even if the buffer circuit on the receiving side of the other communication device should be full of information, vacancies are generated, making it possible to capture the transmitted information from the station opposite thereto.

Also, the communication control device TC terminates transmission of negative acknowledge NACK, when receiving from the buffer empty signal BEb of "1"signal indicating the presence of a vacancy in the buffer circuit on the reception side. If the information set in the receiving register TRb is judged to be correct by the error detection circuit, the control device TC generates the read-in gate signal $G_8$ and the information is put in the buffer circuit BFb via the input gate $G_8$.

Because of such performance in each station of FIG. 2, the information stagnating in each station is successively transmitted to the opposite stations, read into the spare buffer register of the buffer circuit added for stagnation preventing and begins to circulate through the stations. Since, in the process of the circulation, each piece of information reaches the station to which it is addressed, and generation of new externally transmitted information is prohibited, the information transmitted between the stations within the loop of the information processing device gradually decreases, ultimately disappearing completely.

When the information transmitted between the stations of the information processing device thus disappears, the buffer circuits BFa and BFb of the communication device T (FIG. 3) become completely vacant and the first bit output signal $DSa_1$ of the register SRa of the display circuit (FIG. 4) become "0" thereby resetting the stagnation detection flip-flop FF (FIG. 5) of the stagnation detection device TZ. Thus, the stagnation detection signal ZS becomes "0" signal and informs that the transmission stagnation has been perfectly handled and dissolved. When the stagnation detection signal ZS returns to "0" signal, the communication control device TC changes the performance from the stagnation preventing mode to the normal mode, again prohibiting the generation of the gate signals $g_1$ and $g_8$ to the input gates $G_1$ and $G_8$ of the spare buffer registers $R_{an+1}$ and making effective the gate signals $g_2$ and $g_7$ given to the gates $G_2$ and $G_7$. Therefore, the buffer circuits BFa and BFb return to the original state and the spare buffer registers $R_{an+1}$ and $R_{bn+1}$ are made ineffective to be substantially in the state of separation from the buffer circuit.

As described above, according to this invention, when the occurrence of stagnation in information transmission is detected in a station by observing the same information being transmitted more than a prescribed number of times, vacant registers are formed by prohibiting the generation of new externally transmitted information from the information processing device other than the communication devices in each station at and the same time adding temporarily the spare buffer registers to the buffer circuits of the communication device, and information transmission between the stations can be continued. By continuing information transmission under these circumstances, the transmitted information between the stations remaining in the information processor disappears, dissolving the stagnation in information transmission, so that the so-called deadlock in which information transmission between the stations is completely suspended can be prevented from occurring. Thus, this invention has an effect of improving the reliability of this kind of information processor.

In the above described embodiment of this invention, it is so designed that the spare buffer registers are added to the buffer circuits of the communication devices in each station when transmission stagnation occurs, but a transmission stagnation can be dissolved in principle by adding one buffer register temporarily to the whole information processor. However, it takes a longer time in this case to treat a transfer stagnation. If spare buffer registers are added in all the stations as in the embodiment, there is the merit of being able to treat a transmission stagnation in a short period because the communication devices of all the stations can be constructed indentically and the number of vacant buffer registers in the whole information processor increases. Also, it is necessary to separate the added spare buffer registers and return the buffer circuits to the initial state, by the time the treatment of transmission stagnation has been completed, because if a transmission stagnation occurs with the spare buffer registers added to the buffer circuits, treatment of the information stagnation is impossible due to the absence of vacant buffer registers to be added.

What is claimed is:

1. In an information processing system of the type having,
  a plurality of information processing stations interconnected by transmission means and permitting independent transmissions between adjoining stations,
  said stations having information processing devices for generating and acting upon information, communication devices for transmitting and receiving information to and from other stations, and control means for routing information within a station between the various parts therein,
  said control means including means for responding to demands from said processing devices and from communication devices for transmission of information externally,
  said communication devices including transmit and receive buffer registers for storing, in order, information to be transmitted and received, respectively, and means for retransmitting the same information from a communication device when said same information has not been properly received and accepted at an adjoining station, the improvement comprising, at at least one station,
  a. means for monitoring the retransmission at a communication device and for generating a stagnation mode indicating signal when the retransmissions of said same information exceeds a predetermined number,
  b. receive and transmit buffer register stages,
  c. means, responsive to the occurrence of said stagnation mode indicating signal, for electronically adding said receive and transmit buffer register stages to said receive and transmit buffer registers, respectively, to increase the total information word storage capacity of said registers, and d. means, responsive to the occurrence of said stagnation mode indicating signal, for altering the means for responding to demands from processing devices, whereby information generated by said processing devices is prevented from being transmitted externally of the station wherein said processing devices are located unless such information is already in a transmit buffer register.

2. The apparatus of claim 1 wherein said improvement is located identically at a plurality of said stations.

3. The apparatus of claim 1 further comprising, a. means responsive to said stagnation mode indicating signal for generating a stagnation transmission signal for transmission to other stations, and b. means responsive to receipt of a stagnation transmission signal from another station for electronically adding said buffer stages to said buffer registers and for actuating said means for altering.

4. The apparatus of claim 1 wherein said means for monitoring comprises, a retransmission counter responsive to indications of retransmission for counting said indications, said counter having a preset value therein and being arranged to provide an output signal which is said stagnation mode indicating signal when the number of indications counted thereby exceed the preset value.

* * * * *